United States Patent [19]

Nogues et al.

[11] Patent Number: 5,076,980
[45] Date of Patent: Dec. 31, 1991

[54] METHOD OF MAKING SOL-GEL MONOLITHS

[75] Inventors: Jean-Luc Nogues; Canan Balaban, both of Gainesville; William V. Moreshead, Alachua, all of Fla.

[73] Assignee: Geltech, Inc., Alachua, Fla.

[21] Appl. No.: 561,332

[22] Filed: Aug. 1, 1990

[51] Int. Cl.[5] .............................................. B64C 11/00
[52] U.S. Cl. ....................................... 264/65; 501/12; 264/64; 264/66
[58] Field of Search ...................... 501/12; 264/64, 65, 264/66

[56] References Cited

U.S. PATENT DOCUMENTS 4,272,894  6/1981  Salviati .................................. 264/64

Primary Examiner—William R. Dixon, Jr.
Assistant Examiner—Chris Gallo
Attorney, Agent, or Firm—Finnegan, Henderson, Farabow, Garrett & Dunner

[57] ABSTRACT

A method of making a sol-gel monolith, comprising the steps of:
(a) hydrolyzing and polycondensing one or more oxide precursors to form a sol comprising a plurality of oxide particles suspended in a liquid;
(b) casting said sol into a mold;
(c) gelling said sol by cross-linking said oxide particles to form a gel;
(d) aging said gel to form an aged gel;
(e) subjecting said aged gel to a drying treatment comprising the steps of:
 (i) heating said aged gel in a high humidity environment; and then
 (ii) heating said aged gel in a low humidity environment
to remove liquid from the pores of the aged gel to form a dried, aged gel; and
(f) densifying said dried, aged gel to form a sol-gel monolith.

61 Claims, 1 Drawing Sheet

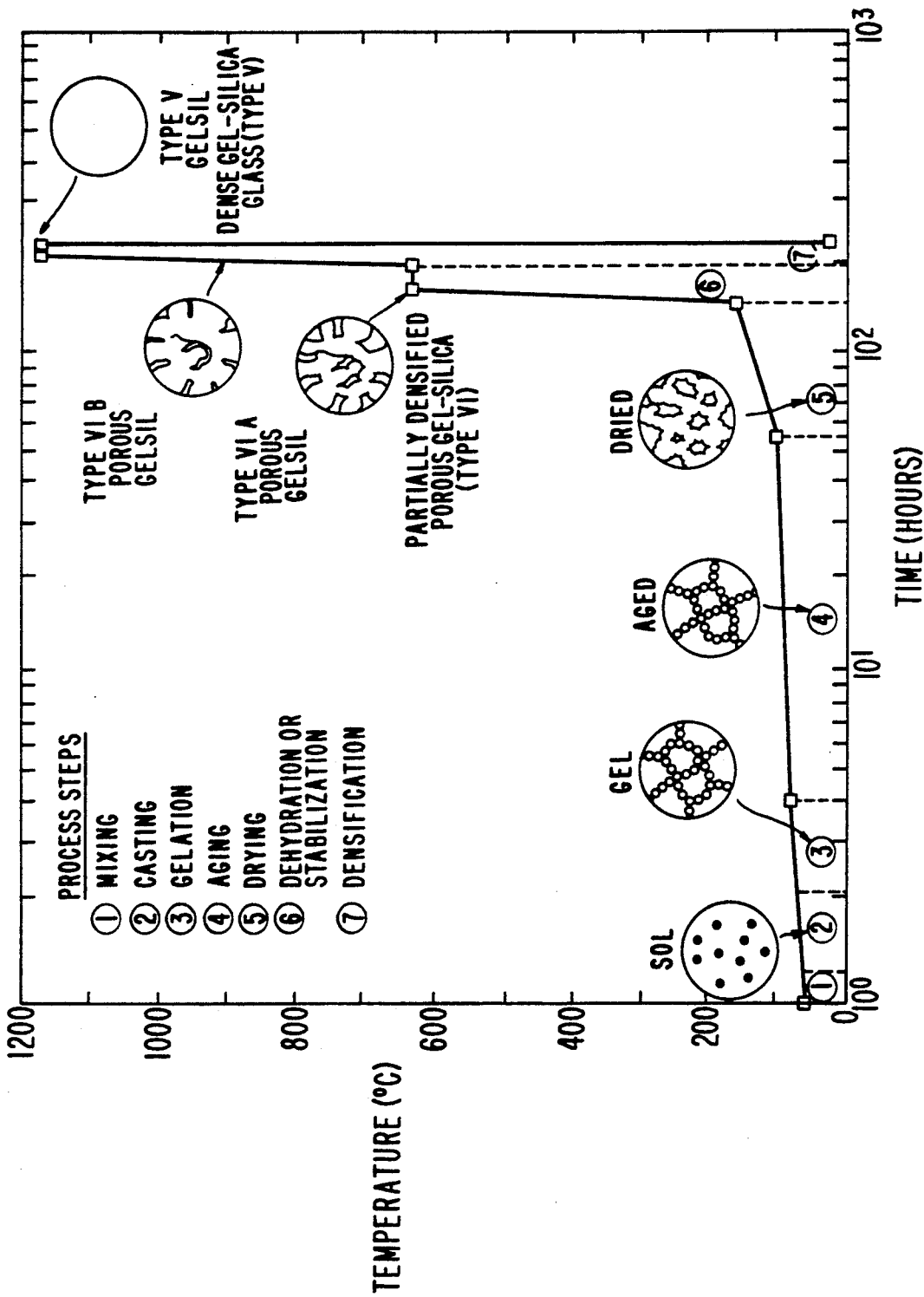

METHOD OF MAKING SOL-GEL MONOLITHS

This invention was funded in part with U.S. Government support under Contract No. F49620-86-C-0120 awarded by the U.S. Air Force. The U.S. Government has certain rights in this invention.

BACKGROUND OF THE INVENTION

Inorganic oxide glass monoliths have found use in many applications such as optical filters, lasers, graded refractive index lenses, micro-optical arrays, waveguides, optical computers, non-linear optical elements, scintillation counters, polarizing filters, fiber optics, electro-optical components and other glass structures.

A recent development in the preparation of monolithic glasses and ceramics is the use of a "sol-gel" process to produce such articles. Because sol-gel monoliths are substantially homogenous in chemical composition and physical structure, porous glass monoliths produced by a sol-gel process have an advantageous combination of properties, and generally have superior optical properties as compared to porous glass monoliths prepared by other techniques. Further, sol-gel derived glass monoliths are substantially free of inorganic or organic impurities.

One of the process schedules for obtaining highly porous, consolidated silica sol-gel monoliths is shown schematically in FIG. 1. This process is more fully described in: (1) an article by L. Hench et al. entitled *Gel-Silica Optics*, 878 SPIE 76 (1988); (2) a paper by Larry L. Hench and Albert G. Fosmoe entitled *Multifunctional Silica Optics*, presented at the MRS fall meeting in Boston, Massachusetts on November 29, 1989; (3) an article by L. Hench et al. entitled *The Sol-Gel Process*, 90 Chem. Rev. 33 (1990); and (4) an article by J. Nogues et al. entitled *Fast, Radiation-Hard Scintillatinq Detector: A Potential Application for Sol-Gel Glass*, 17 J. Amer. Ceram. Soc. 1159 (1988). The disclosures of these documents are hereby expressly incorporated in their entirety by reference.

One of the disadvantages associated with the prior art is that cracking often occurs during the drying of an oxide gel. Although there is no generally accepted explanation for the phenomenon of cracking during drying, a variety of strategies have been devised to avoid such cracking, including: strengthening of the solid network by aging or by the addition of chemical additives; increasing permeability by increasing pore size; and reducing capillary pressure by either increasing pore size, reducing interfacial energies, or drying under supercritical conditions. *Theory of Drying*, Scherer, 73 J. Amer. Ceram. Soc. 3 (1990). Unfortunately, each of these methods has had limited success in practice, and each has some disadvantages, for example, in processing time or sintering temperature.

Thus, there remains a need in the art for a method of preparing oxide sol-gel monoliths which avoids the cracking problems of the prior art, yet still produces oxide sol-gel monoliths possessing all of the advantageous properties associated with this product.

SUMMARY OF THE INVENTION

The present invention, which solves the problems of the prior art, relates to a method of making a sol-gel monolith, comprising the steps of:

(a) hydrolyzing and polycondensing one or more oxide precursors to form a sol comprising a plurality of oxide particles suspended in a liquid;

(b) casting said sol into a mold;

(c) gelling said sol by cross-linking said oxide particles to form a gel;

(d) aging said gel to form an aged gel;

(e) subjecting said aged gel to a drying treatment comprising the steps of:

(i) heating said aged gel in a high humidity environment; and then (ii) heating said aged gel in a low humidity environment to remove liquid from the pores of the aged gel to form a dried, aged gel; and (f) densifying said dried, aged gel to form an oxide sol-gel monolith.

BRIEF DESCRIPTION OF THE DRAWINGS

The present invention will be more readily understood by referring to the following drawing, FIG. 1, which illustrates one of the process schedules for making silica sol-gel monoliths.

DETAILED DESCRIPTION OF PREFERRED EMBODIMENTS

As explained above, there is a need in the art for a method of preparing sol-gel monoliths which avoids the cracking problems typically encountered during the drying of the gel. To achieve this goal, the present invention uses a unique drying process resulting in the more reliable production of crack free porous monoliths and, thus, the more efficient production of fully dense monoliths. The advantages achieved were not possible until the present invention.

The method of making a sol-gel monolith, according to the present invention, comprises the steps of:

(a) hydrolyzing and polycondensing one or more oxide precursors to form a sol comprising a plurality of oxide particles suspended in a liquid;

(b) casting said sol into a mold;

(c) gelling said sol by cross-linking said oxide particles to form a gel;

(d) aging said gel to form an aged gel;

(e) subjecting said aged gel to a drying treatment comprising the steps of:

(i) heating said aged gel in a high humidity environment; and then (ii) heating said aged gel in a low humidity environment to remove liquid from the pores of the aged gel to form a dried, aged gel; and (f) densifying said dried, aged gel to form an oxide sol-gel monolith.

Step (a) is carried out by mixing one or more oxide precursors with water and a catalyst. Precursors useful in the present invention include, but are not limited to, alkoxides and other salts or chelates of elements such as silicon, aluminum, boron, phosphorous, germanium, barium, lithium, sodium, titanium, zirconium, magnesium, strontium, hafnium and the like.

Silicon oxide precursors useful in the present invention include, but are not limited to tetraalkoxide silanes, tetraacetoxysilanes, binary or ternary alkoxides with silicon, and alkyl trialkylsilanes. Preferred silicon oxide precursors are tetraalkoxide silanes, which are silicon tetraalkoxides having the general formula $Si(OR)_4$ wherein R is an alkoxide group. Examples of such compounds are tetramethoxysilane, tetraethoxysilane, tetrapropoxysilane and tetrabutoxysilane. If pure silicon dioxide is the desired end product, tetramethoxysilane (TMS) is preferred as the precursor for the $SiO_2$ monomer units and Si—O—Si bonds in the final structure.

When an oxide precursor reacts with water, a hydrolysis reaction produces a suspension of colloidal oxide-based particles, referred to as a "sol." For example, the mixing of water with a tetraalkoxide silane, such as TMS, forms a silica sol through the following hydrolysis:

$$Si(OR)_4 + 4(H_2O) \rightarrow Si(OH)_4 + 4ROH$$

and polycondensation reactions:

$$Si—OH + OH—Si \rightarrow Si—O—Si + H_2O$$

The two competing mechanisms which determine the final ultrastructure of the resulting gel are (1) the shelf growth or agglomeration of the monomer units into oxide particles and (2) the linkage of the oxide particles into chains and a fibrillar network.

The liquid forming the sol according to the present invention is made up of water and a catalyst initially mixed with the oxide precursor and any by-products produced during the hydrolysis reaction. Furthermore, other soluble metal salts and the like may be present in the sol liquid.

Catalysts which may be used in the process according to the present invention include, but are not limited to, acids such as oxalic, nitric, hydrochloric, sulfuric, hydrofluoric and acetic acids; and bases such as ammonia. Preferably, nitric acid is used as the catalyst. The amount of the catalyst varies widely depending on the precursor used and the relative concentrations of other chemicals which may be present in the liquid forming the sol. When a silicon alkoxide is the oxide precursor, typically about 0.003 to about 0.100 moles catalyst is used per mole of TMS, with smaller concentrations of the catalyst being generally less effective and larger concentrations tending to be not economical.

It is known in the prior art to add to the liquid forming the sol an organic solvent, such as an alcohol, to make a precursor such as a metal alkoxide miscible with the water used during the hydrolysis step. According to the present invention, however, the addition of such an organic solvent is not required. If an organic solvent is used, it is preferably used in a molar ratio of organic solvent to precursor of between about 0 and 100 mole/-mole. More preferably, however, there is no initial addition of any solvent, although, as previously discussed, a limited amount of solvent may be inherently present in the liquid of the resulting sol as a by-product of the hydrolysis reaction. By decreasing the amount of solvent supplied to the liquid from an external source, this enables additional manipulation of the sample, such as transfer from container to container, at an earlier point in the process, which may be advantageous during the remainder of the process.

In a preferred embodiment of the invention, TMS and nitric acid are used as the oxide precursor and the catalyst, respectively. Preferably, nitric acid, in a mole ratio of about 0.0450 moles per mole of TMS is added to about 70 moles of distilled water. After the nitric acid/-water solution is formed, from about 1 to about 18 moles of TMS, preferably from about 4 to about 9 moles TMS, is added to the solution, which is then mixed continuously for a time between about 5 minutes to about 5 hours, at temperatures ranging from just above the freezing point up to about the boiling point of the sol. The use of mixing temperatures at the high end of this temperature range results in shorter gelation times.

The mixing may be carried out in any conventional manner, for example, by 1) magnetic stirring, 2) direct drive paddle stirring, 3) sonication, or 4) the use of a static mixer.

The intimately mixed sol is then preferably cast from its mixing vessel into a mold. In some cases, the mixing may be carried out directly inside the mold. The mold is preferably leakproof and air tight to avoid loss of liquids during processing. The shape, material and quality of the mold surface will determine the shape and surface quality of the resulting gel monolith. A mold with high surface quality will produce a final product which requires only minimal refinishing to obtain a usable surface. Molds can be made from many types of materials, including various plastics, glass, metal, fiberglass, coated metal, ceramic, wood and the like. A particularly preferred mold material is a plastic such as polystyrene, polypropylene, polymethylpentene and non-stick fluorine-containing resins such as those sold under the trademark TEFLON ®.

Optionally, the sol may be filtered during casting, preferably, with a nonreactive membrane having a pore size on the order of about 0.1 to about 5 a few microns, preferably about 0.5 microns or less. Filtering the sol may remove undesirable particulate inclusions in the gel which might limit its usefulness for some applications.

The gelling step (c) typically takes place in the mold and, thus, the resulting gel takes the shape, configuration, and surface finish of the mold. The gelling step (c) may be carried out at a temperature between about the freezing point and the boiling point of the sol, preferably between about 15° and 60° C., and more preferably between about 18° and 25° C. Further, the gelling step (c) may be carried out for a time between a few minutes and several months, preferably between about one hour and about one month, more preferably for a time between about two hours and about seven days. The time required for relation depends upon the temperature at which the cross-linking of the sol is taking place, i.e., lower temperatures require longer gelation times.

The resulting solidified gel is then preferably transfered to an aging oven. During the aging process, shrinkage, which increases with higher aging temperatures, occurs without drying. During shrinkage, liquid is expelled or expressed from the gel into the container, and the strength of the network of the gel typically increases many times.

The aging step (d) is typically carried out at a temperature between about the freezing point of the interstitial liquid of the gel and up to a temperature of about 250° C., preferably at a temperature of from about 15° to about 80° C. Further, the aging may take place for a time between about one hour and several months, preferably from about two hours to about one month, and more preferably for from about two to about five days. Ultimately, the time required depends upon the temperature used and the size of the monolith being produced.

During the aging step (d), the gels may undergo at least one treatment wherein the gels are held at a constant temperature for a period of time of between about one hour and about 24 hours. The treatment of holding the gels at a constant temperature may be performed just once or twice, or it may be performed several times.

The gels then may be cooled to room temperature prior to the next step, if desired.

After aging, the gels are subjected to a drying treatment, step (e), comprising the steps of:
  (i) heating the aged gel in a high humidity environment; and then
  (ii) heating the aged gel in a low humidity environment
to remove liquid from the pores of the aged gel to form a dried, aged gel.

During step (e), the gels are transferred into an oven in which the temperature and atmosphere, specifically the humidity, are directly or indirectly controlled, preferably directly controlled by a microprocessor. In a typical method of making sol-gel monoliths, the drying is done by an uncontrolled evaporation of the liquid phase from the gel. In the method according to the present invention, however, the atmosphere is either directly monitored and controlled or indirectly controlled during the entire step (e). By controlling the atmosphere surrounding the gels, it is possible to control and tailor the ultrastructure, mechanical strength, and other properties of the gels to achieve the desired characteristics.

In general terms, the drying treatment is carried out at a temperature of from about room temperature to about 200° C., preferably at a temperature of from about 40° to about 160° C., for at least two hours, preferably for a time between about two hours and about 15 days, more preferably for between about two hours and about seventy hours, most preferably between about two hours and about forty hours.

During the heating of the gel in the high humidity environment, step (e)(i), the relative humidity is typically maintained at between about 50% and 100%, preferably between about 80% and 100%, and more preferably between about 95% to about 100%. The relative humidity may be maintained at these levels in at least two different ways.

In one embodiment, the water content of the atmosphere inside the oven to which the gels have been transferred is maintained or replaced several times by constantly injecting steam inside the oven, thus directly maintaining relative humidities as high as 100%. It is also possible to place the gels into a container which itself is then placed in an oven. After the container is in the oven, the atmosphere inside the container may be directly controlled as described above.

In another embodiment, the gels may be placed in a container made of a non-stick fluorinated resin such as that sold by Savillex Corp. under the trademark TEFLON ® and completely immersed in water. The container is then covered with a lid having a small hole, which is small enough so that, once inverted, the water flow is restrained to a slow rate, such as a slow trickle or a stream of dripping water. The hole, however, should also be large enough to allow water to escape at a rapid enough rate to accommodate the expanding hot water vapor produced as the container is heated, thereby preventing an undesirable build-up of pressure within the container which might force the sudden, uncontrolled expulsion of all water within the container. The sudden expulsion of all water from the container might end prematurely the high humidity step of the drying treatment. A typical hole size to accomplish both of these purposes is about 0.5 mm in diameter.

The container with the hole in its lid is placed in an oven in an inverted position, so that the hole in the lid is in a downward facing position. During the early stages of heating, i.e., stip (e)(i), water is slowly expelled through the hole until the container becomes empty. This slow expulsion is induced by the gradual production of steam inside the container and the gradual increase in the volume of the liquid with increasing temperature. By this process, an atmosphere completely or very nearly completely saturated with water vapor may be indirectly maintained throughout the earlier high humidity part of the drying treatment, i.e., step (e)(i).

When the gels are first placed in the oven, by either of the methods discussed above, a relatively low temperature, for example, about 40°-80° C., is preferably maintained. During step (e)(i), however, the heating is typically increased to a temperature of between about 40° C. and about 100° C., preferably about 99° C. The heating may be carried out for more than two hours, preferably for a time between about two hours and about fifteen days, more preferably from about two hours to about seventy hours and, most preferably, for from about two hours to about forty hours.

Following the heating in a high humidity environment, step (e)(i), the gels are then subjected to heating in a low humidity environment, step (e)(ii). During this step, the temperature is typically raised to about 200° C., preferably about 160° C., and the humidity is typically decreased to between about 50% relative humidity and less than about 5 parts per million. In one embodiment, the decrease in humidity is indirectly accomplished through limiting the production of steam inside the oven by maintaining the higher temperature and simultaneously allowing the water vapor in the atmosphere to escape from the oven or container. In another embodiment, the oven or container may be directly purged with very dry, compressed air or gas for a period from about one hour to about seventy hours.

The drying treatment, step (e) set forth above, is not only useful in drying oxide sol-gel materials as described above but also may be used to dry other porous types of materials such as clay and the like.

The dried sol-gels obtained according to the present invention are then densified, step (f), typically by heating the gels in a furnace to a temperature between about the maximum of the drying temperature and about 1400° C. The temperature is preferably increased at a rate of from about 10 to about 500° C./hour. The densification step is typically carried out in a flow of dried atmospheric air, inert gas, or in a flow of dried gas containing at least 1% oxygen, 1% chlorine, 1% fluorine or a combination thereof at a flow rate between zero and about several hundred standard cubic feet per hour. During the densification step, the gels are preferably subjected to at least one treatment wherein the temperature is maintained at a constant level for from about 1 to about 6 hours. After the temperature has been maintained at the predetermined maximum temperature level for at least one predetermined period of time, the furnace may be cooled down to about room temperature at a rate of from about 10 to about 500° C./hour in the same atmosphere.

The densification step (f) may be carried for a period of time and under temperatures to produce either partially densified or fully densified sol-gel monoliths. In the case where a silicon alkoxide is used as the oxide precursor and only partial densification is carried out, for example, in accordance with the times and temperatures shown in FIG. 1 for Type VI, VIA or VIB porous products, the resulting porous sol-gel monolith corresponds to Type VI silica, which is commercially available from GELTECH, Inc. under the trademark POROUS GELSIL ®.

Full densification may be obtained, for example, by heating the partially densified sol-gel monolith resulting above in a furnace to a temperature of from about 400° to about 1400° C. in dry air or gas. The temperature is typically raised at a rate of from about 10 to about 500° C./hour. The material is preferably held at a maximum temperature of from about 400° to about 1000° C. for a period of from about one treatment. The hydroxyl group removal treatment is performed at least once. This treatment is typically accomplished by injecting into the furnace an atmosphere of dry gas containing at least 1% chlorine, fluorine, or compounds such as $CCl_4$, $SiCl_4$, $CCl_2F_2$, $SOCl_2$, HCl and the like. After the hydroxyl group removal treatment, the sol-gel monolith is preferably heated at a temperature raising rate of from about 10 to about 500° C./hour up to a maximum temperature of from about 1100° to about 1400° C. in a dry gas atmosphere.

During the post hydroxyl group removal treatment period, the material is typically maintained at a constant, predetermined temperature for a time between about 1 about 6 hours. This treatment of maintaining a constant temperature may be performed several times. An atmosphere of dry gas containing at least 1% oxygen, at a temperature of from about the temperature of the hydroxyl group removal treatment to about 1200° C., is preferably used to remove residual impurities from the sol-gel monolith.

After the maximum temperature of densification is reached and maintained for a period of time, the temperature of the furnace is typically decreased down to about room temperature at a rate of from about 10 to about 500° C./hour in a dry gas atmosphere. After full densification, the sol-gel monolith obtained is non-porous. In the case where a silicon alkoxide is used as the oxide precursor and full densification is carried out, the resulting fully dense sol-gel monolith corresponds to Type V silica, which is commercially available from GELTECH, Inc. under the trademark GELSIL ®.

During densification, retrodiffusion of any impurities back into the furnace from the exhaust should be limited, if not completely eliminated. One method of preventing such retrodiffusion is to equip the exhaust of the furnace with an antidiffusion system, such as a trap containing a nonaqueous substance such as mineral oil and the like.

In a preferred embodiment of the invention, at the conclusion of the densification step, the surface porosity of the sol-gel monolith, especially if the monolith is only partially dense, may be sealed with a coating or film, rendering the surface nonporous with respect to any impurities in the environment but as yet outside the pores of the monolith. Typical methods for sealing the surface porosity of the sol-gel monolith include surface sealing such as by a thermal gradient via localized heating; applying an organic or inorganic coating or other substance which effectively prevents the migration of impurities into the monolith; or low temperature densification (Td) of the surface by doping an outer layer with low valence fluxing additives, such as Na, Li, B, Pb, and the like.

Preferably, the surface is sealed with a polymer, such as by dipping or spraying with an organic solution of the polymer. Suitable polymers for this purpose include, but are not limited to, poly(methyl methacrylate), polyvinyl acetate, polyvinyl chloride, polyurethane, polyethylene, epoxy resin, hydroxyethylcellulose, and the like. Inorganic materials, such as transparent metal coatings or nonporous sol-gel coatings, also may be used as surface sealants.

The following examples are illustrative of the present invention and are not meant to limit the invention.

EXAMPLE 1

A solution of 0.2 moles (17.8g) of concentrated nitric acid and 70.15 moles (1262.7g) of deionized water was formed. To this solution, 4.4 moles (669.5g) of TMS was added over 3–5 minutes with continuous stirring. The temperature of the solution was then raised to its boiling temperature, and the solution was allowed to boil for 20 minutes. The solution was then cooled to 50° C. or below and cast into a polypropylene jar, where it was maintained at ambient temperature until gelation occurred (approximately 48 hours). The gel formed was placed in an oven at 40° C. for 12 hours and then heated at a rate of 4° C./hour to 80° C., which temperature was maintained for 24 hours. The heated gel was cooled to 40° C. over one hour and then cooled further at ambient temperature for another hour.

The gel was then transferred to an oven in which the temperature and atmosphere were directly controlled by a microprocessor. Initially, the oven was maintained at a temperature of 40° C. and a relative humidity of 99.9%. Once the gel was placed in the oven, the temperature was increased to 99° C. over four hours while maintaining the 99% relative humidity. The oven was then kept at 99° C. and 99.9% humidity for 2 hours, at which time the temperature was increased to 102° C. over 0.5 hour. The temperature was maintained at 102° C. for 7.5 hours, during which time small controlled amounts of water were added to the oven using a wet bulb. After 7.5 hours, the temperature was increased to 120° C. over an 8 hour period, followed by an increase to 160° C. over 4 hours. During the last temperature increase, the oven was purged with very dry, compressed air. After maintaining the temperature at 160° C. for two additional hours, the oven was cooled to 120° C. over a one hour period while still being purged with dry air. Before removing the dried gel, the oven was cooled to 40° C.

The dried gel was placed on a quartz diffusion boat with a 1 to 2 mm clearance between it and other gels being simultaneously treated. The diffusion boat was then placed in a furnace maintained at a temperature of 80° C., and the furnace was closed. Dry air was flowed through the furnace at 80 SCFH (standard cubic feet per hour).

The following ramp and constant temperature schedule was followed to partially densify the gel:
1) the temperature was increased from 80° to 190° C. over 6 hours, followed by maintaining the temperature at 190° C. for 1 hour;
2) the temperature was then increased to 400° C. over 9.5 hours, followed by maintaining a temperature of 400° C. for 2 hours; and finally
3) the temperature was increased to 626° C. over 12.5 hours and then to 820° C. over 10 hours, followed by maintaining a temperature of 820° C. for 10 hours.

The furnace was then cooled down to 80° C over 14.4 hours. The resulting partially densified gel monolith was crack-free.

After the run was complete, the furnace was opened and the gel was removed. The partially densified gel was placed on a quartz ladder which was then placed directly in the center of a controlled atmosphere furnace. A heat barrier was placed in the front end of the furnace tube, and an end cap was placed on the end. The joints were then sealed with non-stick tape made from a TEFLON® polymer. The furnace was equipped with a system to avoid retrodiffusion of any impurities into the furnace through the exhaust.

Helium gas was fed, at a rate of 48 cc/minute, into the front end of the furnace tube, and the exhaust gases from the furnace were passed through a 1 N caustic trap before they were exhausted to the atmosphere, thus removing the toxic chemicals in the gas stream. The temperature of the furnace was increased from 80° to 500° C. over 6 hours, at which point helium gas was bubbled through a carbon tetrachloride glass gas washing bottle (500 cc capacity) having a glass frit at the bottom of the inlet tube. The bottle was filled with $CCl_4$ to approximately ⅔ capacity. This treatment was continued for 60 hours.

At the end of this treatment, $CCl_4$ was removed from the loop and only helium gas was fed to the furnace tube at a flow rate of 250 cc/minutes. The furnace was purged for 2 hours at this temperature. Then the temperature was increased to 800° C. over 7 hours. At the end of this period, oxygen flow was started at a rate of 250 cc/minutes, and the temperature was increased to 900° C. over 5 hours, at which point this temperature was maintained for 1 hour. The temperature was then increased to 1000° C. over 5 hours, followed by maintaining this constant temperature for 24 hours.

At the end of this treatment, the oxygen flow was stopped. The temperature was increased to 1150° C over 2.5 hours, followed by maintaining this constant temperature for 1 hour. The furnace temperature was then cooled down to 900° C. over 11 hours, then to 80° C. over 10 hours. When the furnace temperature reached 80° C., the furnace was opened and the resulting fully dense silica monolith was removed from the furnace.

EXAMPLE 2

The steps set forth in Example 1 were repeated except that, during the initial mixing step, the solution was allowed to cool without boiling. The gels were then cast, and gelation was allowed to take place at ambient temperature for 96 hours rather than for 48 hours. The remainder of the aging process was the same as that set forth in Example 1. The drying step was also the same except that the initial hold under conditions of 99° C. and 99.9% humidity was maintained for 24 hours instead of 2 hours. The rest of the process steps were carried out according to Example 1.

EXAMPLE 3

The steps set forth in Example 1 were repeated except that gelation was allowed to take place at ambient temperature for 168 hours rather than for 48 hours. The remainder of the aging step was the same as in Example 1. The drying step was also the same except that the initial hold under conditions of 99° C. and 99.9% humidity was maintained for 43 hours instead of 2 hours. The rest of the process steps were carried out according to Example 1.

EXAMPLE 4

The steps set forth in Example 1 were repeated except that the partial densification and densification steps were carried out in the same furnace. After maintaining the isotherm of 820° C. during the partial densification step, the furnace temperature was cooled down to a chlorination temperature of 575° C. in 7 hours. The following ramp and constant temperature maintenance schedule was used for full densification after the chlorination step:

from 575° C. to 800° C. over 8 hours;
to 850° C. over 5 hours, maintained for 5 hours;
to 900° C. over 5 hours, maintained for 5 hours;
to 1000° C. over 10 hours, maintained for 10 hours;
to 1100° C. over 10 hours, maintained for 5 hours;
to 1150° C. over 5 hours, maintained for 6 hours;
to 900° C. over 10 hours;
to 80° C. over 10 hours.

EXAMPLE 5

The steps set forth in Example 1 were repeated except that, at the end of the full densification step, the gels were put into a furnace, and the temperature of the furnace was increased to 1350° C. over 13 hours. The gels were held at this temperature for 30 minutes, at which time the furnace temperature was cooled down to 80° C. in 18 hours.

EXAMPLE 6

The steps set forth in Example 1 were repeated except that, during the full densification step, chlorine gas was used instead of $CCl_4$ at a temperature of 830° C.

EXAMPLE 7

The steps set forth in Example 1 were repeated except that the drying of the gels was carried out by the underwater technique. Specifically, after aging, the gels were placed in a TEFLON® container completely filled with water. The container was covered with a lid having a small hole having a diameter of 0.5mm. The container was then placed inside an oven at 80° C. in an inverted position, so that the hole in the lid was in a downward facing position. The temperature was then increased from 80° to 100° C. over two hours, and this temperature was maintained for two hours. The temperature was then increased from 100° to 160° C. over 60 hours. The temperature was maintained at 160° C. for two hours, and then the oven was cooled to 80° C. over two hours.

EXAMPLE 8

The steps set forth in Example 1 were repeated except that a chlorination time of 12 hours was used instead of 60 hours.

EXAMPLE 9

The steps set forth in Example 1 were repeated except that the chlorination step was carried out a temperature of 575° C. for 26 hours, and dry air was used instead of oxygen during the dechlorination step.

EXAMPLE 10

The steps set forth in Example 1 were repeated except that, during full densification, a maximum temperature of 275° C. was used instead of 1150° C.

It will be apparent to those skilled in the art that various modifications and limitations can be made in practicing the present invention. Thus, it is intended that the present invention cover the modifications and limitations of the invention provided they come within the scope of the appended claims and their equivalents.

We claim:

1. A method of making a sol-gel monolith, comprising the steps of:
   (a) hydrolyzing and polycondensing one or more oxide precursors to form a sol comprising a plurality of oxide particles suspended in a liquid;
   (b) casting said sol into a mold;
   (c) gelling said sol by cross-linking said oxide particles to form a gel;
   (d) aging said gel to form an aged gel;
   (e) subjecting said aged gel to a drying treatment comprising the steps of:
      (i) heating said aged gel in a high humidity environment; and then
      (ii) heating said aged gel in a low humidity environment
   to remove liquid from the pores of the aged gel to form a dried, aged gel; and
   (f) densifying said dried, aged gel to form a solgel monolith.

2. A method of making a sol-gel monolith according to claim 1, wherein said oxide precursor is a metal oxide precursor.

3. A method of making a sol-gel monolith according to claim 2, wherein said metal oxide precursor is a silicon oxide precursor.

4. A method of making a sol-gel monolith according to claim 1, wherein said drying treatment is carried out at a temperature between about room temperature and about 200° C.

5. A method of making a sol-gel monolith according to claim 4, wherein said drying treatment is carried out at a temperature between about 40° and about 160° C.

6. A method of making a sol-gel monolith according to claim 1, wherein said drying treatment is carried out for at least two hours.

7. A method of making a sol-gel monolith according to claim 6, wherein said drying treatment is carried out for from about two hours to about fifteen days.

8. A method of making a sol-gel monolith according to claim 7, wherein said drying treatment is carried out for from about two to about seventy hours.

9. A method of making a sol-gel monolith according to claim 1, wherein the relative humidity of said high humidity environment is from about 50% to about 100%.

10. A method of making a sol-gel monolith according to claim 9, wherein the relative humidity of said high humidity environment is from about 80% to about 100%.

11. A method of making a sol-gel monolith according to claim 10, wherein the relative humidity of said high humidity environment is from about 95% to about 100%.

12. A method of making a sol-gel monolith according to claim 1, wherein said heating in a high humidity environment is carried out at a temperature between about 40° C. and about 200° C.

13. A method of making a sol-gel monolith according to claim 1, wherein said heating in a high humidity environment is carried out for at least two hours.

14. A method of making a sol-gel monolith according to claim 13, wherein said heating in a high humidity environment is carried out for from about two hours to about fifteen days.

15. A method of making a sol-gel monolith according to claim 14, wherein said heating in a high humidity environment is carried out for from about two hours to about seventy hours.

16. A method of making a sol-gel monolith according to claim 1, wherein said heating in a high humidity environment is carried out while immersing said gel in water.

17. A method of making a sol-gel monolith according to claim 1, wherein the relative humidity of said low humidity environment is from about 50% to less than about 5 parts per million.

18. A method of making a sol-gel monolith according to claim 1, wherein said heating in a low humidity environment is carried out at a temperature between about 40° C and about 200° C.

19. A method of making a sol-gel monolith according to claim 1, wherein said heating in a low humidity environment is carried out for a time from about one hour to about seventy hours.

20. A method of making a sol-gel monolith according to claim 1, wherein, if any organic solvent is present in the liquid of step (a), the molar ratio of the organic solvent to the oxide precursor used in step (a) is between about 0 and 100.

21. A method of making a sol-gel monolith according to claim 20, wherein no organic solvent is supplied from an external source to the liquid of step (a).

22. A method of making a sol-gel monolith according to claim 1, wherein said sol is filtered to remove undesirable particulate inclusions during said casting step (b).

23. A method of making a sol-gel monolith according to claim 22, wherein said sol is filtered with a nonreactive membrane having a pore size of less than about 0.1 to about 5 microns.

24. A method of making a sol-gel monolith according to claim 1, wherein said gelling step (c) is carried out at a temperature between the freezing point and the boiling point of said sol.

25. A method of making a sol-gel monolith according to claim 24, wherein said gelling step (c) is carried out at a temperature between about 18° and about 25° C.

26. A method of making a sol-gel monolith according to claim 1, wherein said gelling step (c) is carried out for from about two hours to about one month.

27. A method of making a sol-gel monolith according to claim 26, wherein said gelling step (c) is carried out for from about two hours to about seven days.

28. A method of making a sol-gel monolith according to claim 1, wherein said aging step (d) is carried out at a temperature between the freezing point of the interstitial liquid of the gel and about 250° C.

29. A method of making a sol-gel monolith according to claim 28, wherein said aging step (d) is carried out at a temperature of from about 15° to about 80° C.

30. A method of making a sol-gel monolith according to claim 1, wherein said aging step (d) is carried out for from about two hours to about one month.

31. A method of making a sol-gel monolith according to claim 30, wherein said aging step (d) is carried out for from about two to about five days.

32. A method of making a sol-gel monolith according to claim 1, wherein, during said aging step (d), said gel is subjected to at least one treatment wherein said gel is held at a constant temperature for a period of time between about one hour and about 24 hours.

33. A method of making a sol-gel monolith according to claim 1, wherein said densifying step (f) is carried out at a temperature between about the maximum temperature of the drying step (e) up to about 1400° C.

34. A method of making a sol-gel monolith according to claim 1, wherein, during said densifying step (f), the temperature is increased at a rate of from about 10 to about 500° C./hour.

35. A method of making a sol-gel monolith according to claim 1, wherein, during said densifying step (f), said gel is subjected to at least one treatment wherein said gel is held at a constant temperature for a period of about 1 to about 6 hours.

36. A method of making a sol-gel monolith according to claim 1, wherein said densifying step (f) is carried out in a flow of dried atmospheric air or inert gas or in a flow of dried gas containing at least 1% oxygen, 1% chlorine, 1% fluorine or a combination thereof.

37. A method of making a sol-gel monolith according to claim 36, wherein said flow rate is between zero and several hundred standard cubic feet per hour.

38. A method of making a sol-gel monolith according to claim 1, wherein, during said densifying step (f), said sol-gel monolith is only partially densified.

39. A method of making a sol-gel monolith according to claim 1, wherein, during said densifying step (f), said sol-gel monolith is fully densified.

40. A method of making a sol-gel monolith according to claim 1, wherein, during said densifying step (f), an anitdiffusion system is used to prevent the retrodiffusion of impurities from the exhaust.

41. A method of making a sol-gel monolith according to claim 1, further comprising the step of sealing the surface of said sol-gel monolith.

42. A method of making a sol-gel monolith according to claim 41, wherein said sealing is carried out by subjecting the surface porosity of said sol-gel monolith to localized heating.

43. A method of making a sol-gel monolith according to claim 41, wherein said sealing is carried out by applying a polymer coating onto the surface of said sol-gel monolith.

44. A method of making a sol-gel monolith according to claim 41, wherein said sealing is carried out by subjecting said monolith to low temperature densification with surface doping of low valence fluxing additives.

45. A method of drying a gel, which comprises:
 (i) heating said gel in a high humidity environment; and then
 (ii) heating said gel in a low humidity environment to remove liquid from the pores of said gel.

46. A method of drying a gel according to claim 45, wherein said drying is carried out at a temperature between about room temperature and about 200° C.

47. A method of drying a gel according to claim 46, wherein said drying is carried out at a temperature between about 40° and about 160° C.

48. A method of drying a gel according to claim 45, wherein said drying is carried out for at least two hours.

49. A method of drying a gel according to claim 48, wherein said drying is carried out for from about two hours to about fifteen days.

50. A method of drying a gel according to claim 49, wherein said drying is carried out for from about two to about seventy hours.

51. A method of drying a gel according to claim 45, wherein the relative humidity of said high humidity environment is from abut 50% to about 100%.

52. A method of drying a gel according to claim 51, herein the relative humidity of said high humidity environment is from about 80% to about 100%.

53. A method of drying a gel according to claim 52, wherein the relative humidity of said high humidity environment is from about 95% to about 100%.

54. A method of drying a gel according to claim 45, wherein said heating in a high humidity environment is carried out at a temperature between about 40° C. and about 200° C.

55. A method of drying a gel according to claim 45, wherein said heating in a high humidity environment is carried out for at least two hours.

56. A method of drying a gel according to claim 55, wherein said heating in a high humidity environment is carried out for from about two hours to about fifteen days.

57. A method of drying a gel according to claim 56, wherein said heating in a high humidity environment is carried out for from about two hours to about seventy hours.

58. A method of drying a gel according to claim 45, wherein said heating in a high humidity environment is carried out while immersing said gel in water.

59. A method of drying a gel according to claim 45, wherein the relative humidity of said low humidity environment is from about 50% to less than about 5 parts per million.

60. A method of drying a gel according to claim 45, wherein said heating in a low humidity environment is carried out at a temperature between about 40° C. and about 200° C.

61. A method of drying a gel according to claim 45, wherein said heating in a low humidity environment is carried out for a time from about one hour to about seventy hours.

* * * * *